(12) United States Patent
Pequeno et al.

(10) Patent No.: US 9,963,528 B2
(45) Date of Patent: May 8, 2018

(54) METHODS OF MODIFYING THE MELT FLOW RATIO AND/OR SWELL OF POLYETHYLENE RESINS

(71) Applicant: Univation Technologies, LLC, Houston, TX (US)

(72) Inventors: R. Eric Pequeno, Baytown, TX (US); Bruce J. Savatsky, Kingwood, TX (US); Peter S. Martin, Houston, TX (US); Timothy R. Lynn, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days. days.

(21) Appl. No.: 15/319,301

(22) PCT Filed: Apr. 9, 2015

(86) PCT No.: PCT/US2015/025142
§ 371 (c)(1),
(2) Date: Dec. 15, 2016

(87) PCT Pub. No.: WO2015/195188
PCT Pub. Date: Dec. 23, 2015

(65) Prior Publication Data
US 2017/0137551 A1    May 18, 2017

Related U.S. Application Data

(60) Provisional application No. 62/012,644, filed on Jun. 16, 2014.

(51) Int. Cl.
*C08F 210/16* (2006.01)
*C08F 2/34* (2006.01)
*C08F 2/38* (2006.01)
*C08F 4/646* (2006.01)
*C08F 10/02* (2006.01)

(52) U.S. Cl.
CPC ................... *C08F 210/16* (2013.01)

(58) Field of Classification Search
CPC ...... C08F 4/606; C08F 4/61904; C08F 4/646; C08F 4/65904; C08F 201/16; C08F 2500/12; C08F 2/34; C08F 2/38; C08F 2410/04
USPC .......................................................... 526/118
See application file for complete search history.

(56) References Cited

U.S. PATENT DOCUMENTS

| | | |
|---|---|---|
| 2007/0129496 A1 | 6/2007 | Shannon et al. |
| 2010/0249355 A1 | 9/2010 | Davis et al. |
| 2011/0275772 A1 | 11/2011 | Savatsky et al. |
| 2012/0271017 A1 | 10/2012 | Rix et al. |
| 2015/0183905 A1 | 7/2015 | Savatsky et al. |

OTHER PUBLICATIONS

International Search Report & Written Opinion for related PCT Application PCT/US2015/025142, dated Jul. 13, 2015 (11 pgs).
Second Written Opinion for related PCT Application PCT/US2015/025142, dated Jun. 7, 2016 (5 pgs).
International Preliminary Report on Patentability for related PCT Application PCT/US2015/025142, dated Sep. 16, 2016 (14pgs).

*Primary Examiner* — Fred M Teskin
(74) *Attorney, Agent, or Firm* — Brooks, Cameron & Huebsch, PLLC

(57) ABSTRACT

Methods of making polyethylene resins are provided. More particularly methods of modifying the melt flow ratio and swell characteristics of polyethylene resins are provided.

16 Claims, 2 Drawing Sheets

METHODS OF MODIFYING THE MELT FLOW RATIO AND/OR SWELL OF POLYETHYLENE RESINS

This application is a National Stage Application under 35 U.S.C. § 371 of International Application Number PCT/US2015/025142, filed Apr. 9, 2015 and published as WO 2015/195188 on Dec. 23, 2015, which claims the benefit to U.S. Provisional Application 62/012,644, filed Jun. 16, 2014, the entire contents of which are incorporated herein by reference in its entirety.

FIELD OF THE DISCLOSURE

The present disclosure relates generally to methods of making polyethylene resins. More specifically, but without limitation, the disclosure relates to methods of modifying the melt flow ratio and/or swell characteristics of polyethylene resins.

BACKGROUND

Advances in polymerization and catalysis have produced new polymers having improved physical and mechanical properties useful in a wide variety of products and applications. High density polyethylene compositions, for example, are known to be useful for making a variety of commercial products such as films, pipes, and blow molding products. In particular, "bimodal" or "multimodal" high density polyethylenes (bHDPE) are useful in this regard.

In blow molding applications the polyethylene melt flow ratio (MFR) is an important parameter in achieving a good balance of properties. In extrusion blow molding (EBM) applications, bottle weight (weight swell) defined as the post extrusion swelling of the resin as measured by the weight of a bottle blown from the polymer resin, is a critical variable.

Bimodal high density polyethylenes may be produced in a dual reactor system using traditional Ziegler-Natta catalysts. Generally these bimodal resins have a relatively low weight swell. In contrast, unimodal high density polyethylenes produced by a chromium catalyst (Phillips catalyst), generally have a high weight swell. Accordingly, for a given polyethylene production unit, switching between low and high swell polyethylene resins may require switching between quite different catalyst types and reactor configurations. Clearly, this is undesirable and adds complexity to the production process. It would therefore be advantageous to provide a process that overcomes these disadvantages and which may provide access to both high and low swell polyethylene resins.

SUMMARY

In one aspect there is provided a method of modifying the melt flow ratio (MFR) of a polyethylene resin, the method comprising:
  a) feeding a catalyst system comprising at least two different catalyst compounds, hydrogen, ethylene, and optionally a comonomer to a polymerization reactor; wherein the at least two different catalyst compounds produce different average molecular weight polyethylene at the same ratio of hydrogen to ethylene; and
  b) adjusting the ratio of hydrogen to ethylene in the reactor.

The melt flow ratio of the resin may increase with an increase in the ratio of hydrogen to ethylene. Alternatively, the melt flow ratio of the resin may decrease with an increase in the ratio of hydrogen to ethylene.

In another aspect there is provided a method of modifying the swell of a polyethylene resin, the method comprising:
  a) feeding a catalyst system comprising at least two different catalyst compounds, hydrogen, ethylene, and optionally a comonomer to a polymerization reactor; wherein the at least two different catalyst compounds produce different molecular weights at the same ratio of hydrogen to ethylene; and
  b) adjusting the ratio of hydrogen to ethylene in the reactor.

The methods disclosed herein may further comprise adjusting the in-reactor ratio of the at least two different catalyst compounds of the catalyst system.

The methods disclosed herein may further comprise adjusting both the ratio of hydrogen to ethylene and the in-reactor ratio of the at least two different catalyst compounds of the catalyst system so as to modify and/or control the flow index (FI) of the polyethylene.

There is also provided a method of modifying the swell of a polyethylene resin, while maintaining a substantially constant resin flow index (FI), the method comprising:
  a) feeding a catalyst system comprising at least two different catalyst compounds, hydrogen, ethylene, and optionally a comonomer to a polymerization reactor; wherein the at least two different catalyst compounds produce different molecular weights at the same ratio of hydrogen to ethylene; and
  b) adjusting the in-reactor ratio of hydrogen to ethylene and the in-reactor ratio of the at least two different catalyst compounds.

In this context the term "substantially constant" means that the flow index is controlled to within 30% of a target value, or to within 20% of a target value, or to within 10% of a target value, or to within 5% of a target value, or to within 2% of a target value.

The methods disclosed herein may comprise co-feeding to the polymerization reactor a supported catalyst comprising at least two different catalyst compounds and a trim catalyst comprising at least one of the at least two different catalyst compounds of the supported catalyst. The ratio of the catalyst compounds of the catalyst system may be adjusted by increasing or decreasing the feed rate of the trim catalyst to the polymerization reactor relative to the feed rate of the supported catalyst. Accordingly, the in-reactor ratio of the at least two different catalyst compounds may be adjusted.

The in-reactor ratio of the two different catalyst compounds of the catalyst system may be adjusted between about 0.1 and about 10 on a molar basis, or between about 0.5 and about 5, or between about 1.0 and about 3. The in-reactor ratio of the two different catalyst compounds of the catalyst system may be adjusted so as to maintain a substantially constant flow index (FI) as herein described. The extent to which the in-reactor ratio of the two different catalyst compounds of the catalyst system may be adjusted so as to maintain a substantially constant flow index (FI) may depend on the extent to which the MFR and/or swell is modified through adjustment of the hydrogen to ethylene ratio.

The trim catalyst may be provided in a form that is the same or different to that of one of the at least two different catalyst compounds of the catalyst system. However, upon activation by a suitable activator or cocatalyst the active catalyst species resulting from the trim catalyst may be the same as the active catalyst species resulting from one of the at least two different catalyst compounds of the catalyst system.

The melt flow ratio and/or swell of the polyethylene resin may also be further modified by changing the polymerization reaction temperature. The temperature of the polymerization reaction may be adjusted in the range from about 30° C. to about 150° C. or from about 50° C. to about 150° C., or from about 80° C. to about 150° C., or from about 80° C. to about 120° C.

The methods disclosed herein surprisingly allow the MFR and/or swell of a polyethylene resin to be modified during the polymerization process simply by adjusting the $H_2/C_2$ ratio. Furthermore, by also adjusting the in-reactor ratio of the catalyst components the MFR may be modified while at the same time the FI may be controlled. This may allow the FI to be controlled on target or on specification while varying the MFR. The polyethylene resin swell may also be modified while controlling the FI. Accordingly, by adjusting the $H_2/C_2$ ratio and by also adjusting the in-reactor ratio of the catalyst components the polyethylene resin swell may be modified while at the same time the FI may be controlled. This may allow the FI to be controlled on target or specification while varying the polyethylene resin swell. Additionally, variation of reactor temperature may also be used to modify the MFR and/or swell.

The swell may be a weight swell. Additionally or alternatively the swell may be a diameter swell.

The at least two different catalyst compounds of the catalyst system may be supported on a single support or carrier. Alternatively, the at least two different catalyst compounds of the catalyst system may be supported on different supports or carriers.

The trim catalyst may be a non-supported catalyst compound. Additionally or alternatively the trim catalyst may be a supported catalyst compound. The trim catalyst may be in the form of a solution in which the trim catalyst compound is dissolved.

The polyethylene resin may be a unimodal resin, a bimodal resin or a multimodal resin.

The catalyst system may comprise at least one metallocene catalyst compound and/or at least one Group 15 and metal containing catalyst compound.

The at least one metallocene catalyst compound may produce a lower molecular weight polyethylene than the at least one Group 15 and metal containing catalyst compound at the same ratio of hydrogen to ethylene in the polymerization reactor.

The catalyst system may comprise bis(cyclopentadienyl) zirconium $X_2$, wherein the cyclopentadienyl group may be substituted or unsubstituted, and at least one of a bis (arylamido) zirconium $X_2$ and a bis(cycloalkylamido) zirconium $X_2$, wherein X represents a leaving group.

The catalyst system may comprise two or more catalyst compounds comprising a titanium, a zirconium, or a hafnium atom. The catalyst system may comprise two or more of:
(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Me_5phenyl))_2MX_2$,
(propyl cyclopentadienyl)(tetramethylcyclopentadienyl) $MX_2$,
(butyl cyclopentadienyl)$_2MX_2$,
(propyl cyclopentadienyl)$_2MX_2$, and mixtures thereof, wherein M is Zr or Hf, and X is selected from F, Cl, Br, I, Me, benzyl, $CH_2SiMe_3$, and $C_1$ to $C_5$ alkyls or alkenyls.

The metallocene catalyst compound may comprise:
(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
(propyl cyclopentadienyl)(tetramethylcyclopentadienyl) $MX_2$,
(butyl cyclopentadienyl)$_2MX_2$,
(propyl cyclopentadienyl)$_2MX_2$, and mixtures thereof, wherein M is Zr or Hf, and X is selected from F, Cl, Br, I, Me, benzyl, $CH_2SiMe_3$, and $C_1$ to $C_5$ alkyls or alkenyls; and the Group 15 and metal containing catalyst compound may comprise:
$HN(CH_2CH_2N(2,4,6-Me_3phenyl))_2MX_2$ or
$HN(CH_2CH_2N(2,3,4,5,6-Me_5phenyl))_2MX_2$,
wherein M is Zr or Hf, and X is selected from F, Cl, Br, I, Me, benzyl, $CH_2SiMe_3$, and $C_1$ to $C_5$ alkyls or alkenyls.

The catalyst system may comprise any combination of the hereinbefore described catalyst compounds.

The polyethylene resin as disclosed herein may have a melt flow ratio ($I_{21}/I_5$) in the range from about 10 to about 60, where $I_{21}$ and $I_5$ are measured according to ASTM-D-1238 (at 190° C., 21.6 kg or 5 kg weight respectively), a flow index, $I_{21}$, in the range from about 2 to about 60 dg/min, and a density of greater than or equal to about 0.945 g/cc, measured according to ASTM D 792

The polymerization methods may be performed in a single reactor or in multiple reactors. The multiple reactors may be arranged in series or in parallel. The single or multiple reactors may be gas phase reactors, solution phase reactors, slurry phase reactors, high pressure reactors or a combination thereof.

In one form, the methods may be performed in a single gas phase reactor.

The hydrogen to ethylene ratio may be adjusted to within a range from about 0.0001 to about 10 on a molar basis or from about 0.0005 to about 0.1 on a molar basis.

The ratio of the at least one Group 15 and metal containing compound to metallocene compound may be adjusted to within a range from about 0.1 to about 10, or to within a range from about 0.5 to about 6.0, or to within a ratio from about 1 to about 3.0 on a molar basis.

The comonomer may comprise at least one of 1-butene, 1-hexene, and 1-octene.

Where multiple reactors are utilized the process conditions in each reactor may be the same or different. For example, the temperature, the ratio of hydrogen to ethylene or the comonomer concentration may be the same or different in each reactor. Furthermore the ratio of catalyst compounds of the catalyst system may be the same or different in each reactor.

There is also provided a method of manufacturing a blow molded article, comprising: blow molding a polyethylene resin having a melt flow ratio ($I_{21}/I_5$) in the range from about 10 to about 60, where $I_{21}$ and $I_5$ are measured according to ASTM-D-1238 (at 190° C., 21.6 kg or 5 kg weight respectively), a flow index, $I_{21}$, in the range from about 2 to about 60 dg/min, and a density of greater than or equal to about 0.945 g/cc, measured according to ASTM D 792 to produce the blow molded article, wherein the polyethylene resin has a polymerization reactor-modified swell.

The swell may be modified by feeding a catalyst system comprising at least two different catalyst compounds, hydrogen, ethylene, and optionally a comonomer to a polymerization reactor wherein the at least two different catalyst compounds produce different molecular weights at the same ratio of hydrogen to ethylene; and adjusting the hydrogen to ethylene ratio in the polymerization reactor.

The method may further comprise adjusting the in-reactor ratio of the at least two different catalyst compounds of the catalyst system.

The method may further comprise adjusting the temperature of the polymerization reaction in the range from about 30° C. to about 150° C. or from about 50° C. to about 150° C., or from about 80° C. to about 150° C., or from about 80° C. to about 120° C.

The polymerization methods as disclosed herein may further comprise adjusting a comonomer to ethylene ratio to produce a polyethylene resin having a desired MFR and/or a desired resin swell.

There is also provided a blow molded article comprising a polyethylene resin having a polymerization reactor-modified resin swell produced according to any one of the aforementioned embodiments.

The methods disclosed herein surprisingly may allow in-reactor modification or adjustment or tailoring of polyethylene resin swell simply by adjusting the $H_2/C_2$ ratio in the reactor. Further, the in-reactor ratio of the catalyst compounds of the catalyst system may be used to control the FI of the polyethylene resin. Additionally, variation of reactor temperature may also be used to modify the swell.

The methods may allow polyethylene resin swell to be varied between that typical of a bimodal Ziegler Natta resin (low swell) and a unimodal chromium resin (high swell). Advantageously, high and low swell polyethylenes may be accessed in a single production unit using a single catalyst system.

There is also provided a polyethylene resin having a melt flow ratio ($I_{21}/I_5$) in the range from about 10 to about 60, measured according to ASTM-D-1238 (at 190° C., 21.6 kg or 5 kg weight), a flow index, $I_{21}$, in the range from about 2 to about 60 dg/min, and a density of greater than or equal to about 0.945 g/cc, measured according to ASTM D 792 wherein the resin contains less than 1 ppm chromium, or less than 0.5 ppm chromium. The resin may be substantially or essentially free of chromium. The terms "substantially free" and "essentially free", mean that the resin contains less than 0.5 ppm, or less than 0.1 ppm or 0 ppm of chromium.

In another aspect there is provided a polyethylene resin having a melt flow ratio ($I_{21}/I_5$) in the range from about 10 to about 60, measured according to ASTM-D-1238 (at 190° C., 21.6 kg or 5 kg weight), a flow index, $I_{21}$, in the range from about 2 to about 60 dg/min, and a density of greater than or equal to about 0.945 g/cc, measured according to ASTM D 792 wherein the resin contains less than 1 ppm magnesium chloride, or less than 0.5 ppm magnesium chloride. The resin may be substantially or essentially free of magnesium chloride. The terms "substantially free" and "essentially free", mean that the resin contains less than 0.5 ppm, or less than 0.1 ppm or 0 ppm of magnesium chloride.

DETAILED DESCRIPTION

Figure 1:
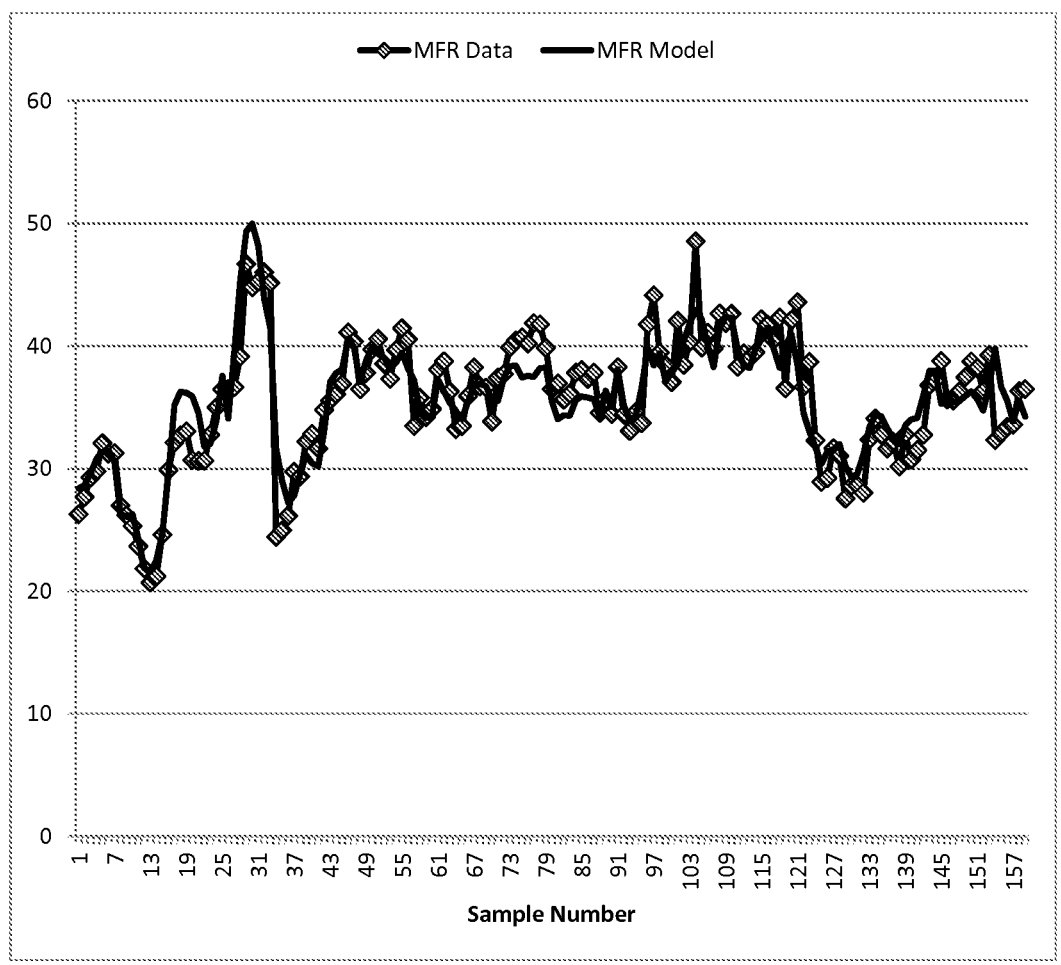
FIG. 1 is a graph illustrating the actual MFR measurements from polymerization pilot plant runs versus the results of a regression analysis of the data.

Before the present compounds, components, compositions, and/or methods are disclosed and described, it is to be understood that unless otherwise indicated this disclosure is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The term "polyethylene" may refer to a polymer or polymeric composition made of at least 50% ethylene-derived units, or at least 70% ethylene-derived units, or at least 80% ethylene-derived units, or at least 90% ethylene-derived units, or at least 95% ethylene-derived units, or even 100% ethylene-derived units. The polyethylene may thus be a homopolymer or a copolymer, including a terpolymer, having other monomeric units. A polyethylene polymer described herein may, for example, include at least one or more other olefin(s) and/or comonomers. Illustrative comonomers may include alpha-olefins including, but not limited to, propylene, 1-butene, 1-pentene, 1-hexene, 1-octene, 1-decene and 4-methyl-1-pentene. Other monomers may include ethacrylate or methacrylate.

The term "bimodal," when used herein to describe a polymer or polymer composition, e.g., polyethylene, may refer to a "bimodal molecular weight distribution." By way of example, a single composition that includes polyolefins with at least one identifiable high molecular weight distribution and polyolefins with at least one identifiable low molecular weight distribution may be considered to be a "bimodal" polyolefin, as that term is used herein. Other than having different molecular weights, the high molecular weight polyolefin and the low molecular weight polyolefin are both polyethylenes but may have different levels of comonomer incorporation.

The term "multimodal" when used herein to describe a polymer or polymer resin, e.g., polyethylene, may refer to a "multimodal molecular weight distribution," that is a material or composition with more than two different identifiable molecular weight distributions, for example, a trimodal molecular weight distribution.

As disclosed herein bimodal polyethylene compositions may comprise a "high molecular weight polyethylene component" ("HMWC") and a "low molecular weight polyethylene component" ("LMWC"). HMWC may refer to the polyethylene component in the bimodal composition that has a higher molecular weight than the molecular weight of at least one other polyethylene component in the same composition. When the composition includes more than two components, e.g., a trimodal composition, then the high molecular weight component is to be defined as the component with the highest weight average molecular weight. The term "low molecular weight polyethylene component" ("LMWC") refers to the polyethylene component in the composition that has a lower molecular weight than the molecular weight of at least one other polyethylene component in the same composition. When the composition includes more than two components, e.g., a trimodal composition, then the low molecular weight component is to be defined as the component with the lowest weight average molecular weight.

A high molecular weight component may constitute a component forming a part of the bimodal composition that has a weight average molecular weight (Mw) of about 500,000 or more. The weight average molecular weight of the high molecular weight polyethylene component may also range from a low of about 500,000, 550,000 or 600,000 to a high of about 800,000, 850,000, 900,000 or 950,000.

The term "unimodal," when used herein to describe a polymer or polymer composition, e.g., polyethylene, may refer to a "unimodal molecular weight distribution". By way of example, a single composition wherein there is no identifiable high molecular weight distribution fraction and/or no identifiable low molecular weight distribution fraction is considered to be a "unimodal" polyolefin, as that term is used herein.

Density is a physical property that may be determined in accordance with ASTM D 792. Density may be expressed as grams per cubic centimeter (g/cc) or unless otherwise noted. The polyethylene composition disclosed herein may have a density of from 0.945 g/cc or above, alternatively 0.950 g/cc or above, alternatively 0.954 g/cc or above, alternatively 0.955 g/cc or above, and alternatively still 0.957 g/cc or above. Illustrative ranges of density for the polyethylene composition may be from 0.950 g/cc to 0.960 g/cc, 0.954 g/cc to 0.960 g/cc, 0.954 g/cc to 0.957 g/cc, 0.955 g/cc to 0.960 g/cc or 0.955 g/cc to 0.957 g/cc.

The term Melt Flow Ratio, or MFR as used herein means the ratio of melt indices. MFR (or $I_{21}/I_5$) is a ratio of $I_{21}$ (also referred to as flow index or "FI") to $I_5$ where $I_{21}$ is measured by ASTM-D-1238 (at 190° C., 21.6 kg weight) and $I_5$ is measured by ASTM-D-1238 (at 190° C., 5 kg weight).

The polyethylene resin may have a FI of at least 2 g/10 min and less than 60 g/10 min. The polyethylene composition may have an FI ranging from a low of about 20 g/10 min to a high of about 40 g/10 min. The polyethylene composition may have an FI ranging from a low of about 24 g/10 min or 26 g/10 min to a high of about 40 g/10 min or 45 g/10 min.

The polyethylene resins as disclosed herein may be characterized by having a melt flow ratio (MFR or $I_{21}/I_5$) ranging from about 10 to about 60, or ranging from about 20 to about 50. The polyethylene resins may be unimodal or bimodal or multimodal polyethylene resins.

Methods disclosed herein relate to the modification or tailoring of the MFR of polyethylene resins. More specifically, methods disclosed herein relate to polymerization reactor-tailoring or modification of the MFR of polyethylene resins.

The MFR of a polyethylene resin, produced using a catalyst system as disclosed herein, may be tailored during the polymerization process by properly targeting or adjusting the hydrogen to ethylene ratio. For example, a polyethylene having tailored MFR characteristics may be produced by feeding a catalyst system, hydrogen, and ethylene to a polymerization reactor, and adjusting the hydrogen to ethylene ratio to produce a polyethylene resin having a desired MFR. Selection of the polymerization reaction temperature may additionally be used to tailor the MFR.

To aid in tailoring of the MFR, a hydrogen to ethylene ratio range that may be used to produce a polyethylene resin having a desired flow index or desired molecular weight distribution using the catalyst system may be determined. MFR characteristics of the resins over the hydrogen to ethylene ratio range may also be determined.

Additionally, adjusting the in-reactor ratio of catalyst compounds of the catalyst system as well as the hydrogen to ethylene ratio may be used to tailor polyethylene resin MFR and control or target flow index (FI) of the resin. Furthermore, selection of the polymerization reaction temperature may additionally be used to tailor the MFR.

In addition to hydrogen to ethylene ratio, the comonomer to ethylene ratio may also have an impact on MFR characteristics of the resulting polymer. The method of tailoring the polyethylene resin may further include determining a comonomer to ethylene ratio range to produce the polyethylene resin having a desired flow index, a desired density, a desired molecular weight distribution, or any combination thereof, and operating the reactor within the determined range. Comonomers may include, for example, at least one of 1-butene, 1-hexene, and 1-octene. The comonomer to ethylene ratio may then be selected, in conjunction with the hydrogen to ethylene ratio to tailor the MFR characteristics of the resulting polyethylene.

The polyethylene resins may be characterized by having a bimodal molecular weight distribution including: 30-50% by weight of a high molecular weight component having a number average molecular weight $M_n$ in the range from about 80,000 to about 180,000 and a weight average molecular weight $M_w$ in the range from about 400,000 to about 900,000; and a low molecular weight component having a number average molecular weight $M_n$ in the range from about 9,000 to about 13,000 and a weight average molecular weight $M_w$ in the range from about 30,000 to about 50,000.

Methods disclosed herein also relate to the modification or tailoring of swell properties of polyethylene resins. More specifically, methods disclosed herein relate to polymerization reactor-tailoring or modification of the swell properties of polyethylene resins. These may be used as an alternative or in addition to post-reactor tailoring of the swell properties, such as by oxygen tailoring.

The term "swell," as used herein, refers to the enlargement of the cross sectional dimensions, with respect to the die dimensions, of the polymer melt as it emerges from the die. This phenomenon, also known as "Barus effect," is widely accepted to be a manifestation of the elastic nature of the melt, as it recovers from the deformations it has experienced during its flow into and through the die. For blow molding applications, the swell of the parison may be described by the enlargement of its diameter ("flare swell") or of its cross-sectional area ("weight swell") compared to the respective dimensions of the annular die itself.

The swell of a polyethylene resin, produced using a catalyst system as disclosed herein, may be tailored during the polymerization process by properly targeting or adjusting the hydrogen to ethylene ratio. For example, a polyethylene having tailored swell characteristics may be produced by feeding a catalyst system, hydrogen, and ethylene to a polymerization reactor, and adjusting the hydrogen to ethylene ratio to produce a polyethylene resin having a desired swell.

To aid in tailoring of the swell characteristics, a hydrogen to ethylene ratio range that may be used to produce a polyethylene resin having a desired flow index or desired molecular weight distribution using the catalyst system may be determined. Swell characteristics of the resins over the hydrogen to ethylene ratio range may also be determined.

Additionally, adjusting the in-reactor ratio of catalyst compounds of the catalyst system as well as the hydrogen to ethylene ratio may be used to tailor polyethylene resin swell and control or target flow index (FI) of the resin.

In addition to hydrogen to ethylene ratio, the comonomer to ethylene ratio may also have an impact on swell characteristics of the resulting polymer. The method of tailoring the polyethylene resin may further include determining a comonomer to ethylene ratio range to produce the polyethylene resin having a desired flow index, a desired density, a desired molecular weight distribution, or any combination thereof, and operating the reactor within the determined range. Comonomers may include, for example, at least one of 1-butene, 1-hexene, and 1-octene. The comonomer to ethylene ratio may then be selected, in conjunction with the hydrogen to ethylene ratio to tailor the swell characteristics of the resulting polyethylene.

The above described resins having a tailored swell characteristic may be used to produce blow molded components or products, among other various end uses. Additionally, swell characteristics of resins having a polymerization reactor-tailored swell characteristic may be further enhanced by post-reactor processes, such as oxygen tailoring, for example, as described in U.S. Pat. No. 8,202,940.

As described above, polyethylene resins produced according to embodiments herein may have swell characteristics tailored to produce lighter or heavier blow molded products under similar blow molding conditions, as may be desired. The method may include blow molding a first polyethylene resin having a density and a flow index to produce a blow molded component; and blow molding a second polyethylene resin having approximately the same density and flow index to produce the blow molded component, wherein the second polyethylene resin has a polymerization reactor-tailored swell (i.e., where the swell characteristics are tailored via reaction conditions).

While use of relative terms, such as greater than, less than, upper, and lower, are used above to describe aspects of the swell characteristics, component weight, hydrogen to ethylene ratio, etc., such terms are used relative to one another or comparatively, and are thus readily understandable to those of ordinary skill in the art with respect to the metes and bounds inferred by use of such terms.

As used herein, structural formulas are employed as is commonly understood in the chemical arts; lines ("--") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Catalyst Systems

As used herein, a "catalyst system" may include a catalyst, at least one activator, and/or, at least one cocatalyst. A catalyst system may also include other components, for example, supports, and is not limited to the catalyst component and/or activator or cocatalyst alone or in combination. The catalyst system may include any suitable number of catalyst components in any combination as described herein, as well as any activator and/or cocatalyst in any combination as described herein. The catalyst system may also include one or more additives commonly used in the art of olefin polymerization. For example, the catalyst system may include continuity additives or flow aids or anti-static aids.

The catalyst system may include at least two catalyst compounds. The catalyst system may also include at least one catalyst (sometimes referred to herein as an "HMW catalyst") for catalyzing polymerization of a high molecular weight fraction of the product and at least one catalyst (sometimes referred to herein as an "LMW catalyst") for catalyzing polymerization of a low molecular weight fraction of the product.

The at least two catalyst compounds may have different hydrogen responses. By this it is meant that the change in average molecular weight of a polyethylene made by each of the catalyst compounds may be different when the $H_2/C_2$ ratio is changed. The term "high hydrogen response" may be used to define a catalyst that displays a relatively large change in the average molecular weight of polyethylene when the $H_2/C_2$ ratio is changed by a set amount. The term "low hydrogen response" may be used to define a catalyst that displays a relatively low change in average molecular weight of polyethylene when the $H_2/C_2$ ratio is changed by the same set amount.

The catalyst system may be referred to as a "bimodal catalyst system" that is, it produces a bimodal polyethylene having identifiable high molecular weight and low molecular weight distributions.

Catalyst systems useful for the production of polyolefins as disclosed herein may include two or more catalyst compounds. Such catalyst systems as disclosed herein may include a first catalyst compound for producing a high molecular weight polymer fraction and and one or more further catalyst compounds for producing one or more low molecular weight polymer fractions, thus producing a bimodal or multimodal polymer.

The second catalyst compound for producing a low molecular weight polymer fraction may be a metallocene. For example, the first catalyst component may be a modified Ziegler-Natta catalyst and the second catalyst component may be a single site catalyst compound, such as, for example, a metallocene catalyst compound. The first catalyst component and the second catalyst component may each be a single site catalyst compound, such as, for example, a metallocene catalyst compound.

The catalyst systems as disclosed herein may allow for production of polymers having bimodal or multimodal composition distributions in a single reactor.

Examples of bimodal catalyst systems that may be useful in embodiments herein are disclosed, for example, in US20120271017, US20120046428, US20120271015, and US20110275772, each of which are incorporated herein by reference.

The first catalyst compound may include one or more Group 15 and metal containing catalyst compounds. The Group 15 and metal containing compound generally includes a Group 3 to 14 metal atom, or a Group 3 to 7, or a Group 4 to 6, or a Group 4 metal atom bound to at least one leaving group and also bound to at least two Group 15 atoms, at least one of which is also bound to a Group 15 or 16 atom through another group.

At least one of the Group 15 atoms may be bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 and metal containing compound may be represented by the formulae:

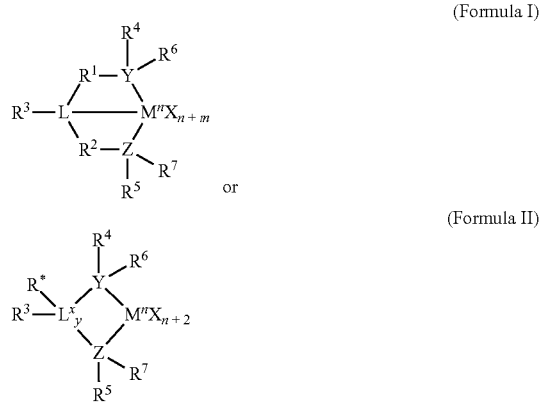

(Formula I)

or (Formula II)

wherein M is a Group 3 to 12 transition metal or a Group 13 or 14 main group metal, or a Group 4, 5, or 6 metal, or a Group 4 metal, or zirconium, titanium or hafnium, each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a Ci to $C_{20}$ hydrocarbon group, a Ci to $C_{20}$ aryl group or a Ci to $C_{20}$ aralkyl group, or a heteroatom containing group, for example $PR_3$> where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following formula:

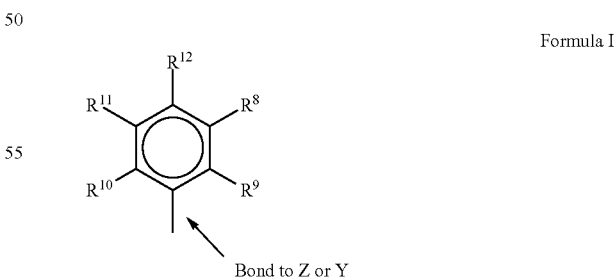

Formula I

Bond to Z or Y wherein $R^8$ to $R^{12}$ are each independently hydrogen, a Ci to $C_{40}$ alkyl group, a halide, a heteroatom, a heteroatom containing group containing up to 40 carbon atoms, preferably a Ci to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{16}$ and $R^{12}$ may be independently a methyl, ethyl, propyl or butyl group (including all isomers). In a preferred embodiment R, $R^1$ and R are methyl groups, and R and R are hydrogen.

$R^4$ and $R^5$ may be both a group represented by the following formula:

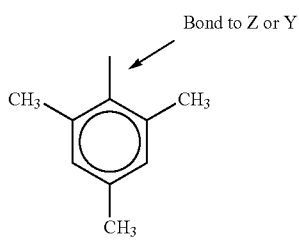

Formula 2 where M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

The Group 15 and metal containing compound may be Compound 1 (also referred to as "bis(arylamido)Zr dibenzyl") represented below:

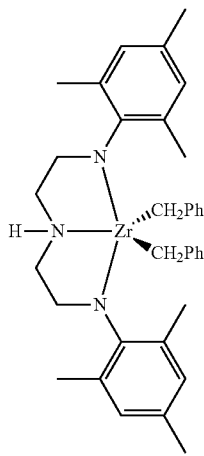

In the representation of Compound 1, "Ph" denotes phenyl. The expression "benzyl" (or "Bz") is sometimes used to denote the substance $CH_2Ph$, which is shown in the representation of Compound 1.

Group 15 and metal containing catalyst compounds may be prepared by methods known in the art. In some cases, the methods disclosed in EP 0 893 454 A1, U.S. Pat. No. 5,889,128 and the references cited in U.S. Pat. No. 5,889, 128 are suitable.

A preferred direct synthesis of these compounds comprises reacting the neutral ligand, (see for example YZL or YZL' of formula 1 or) with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be prepared by a method comprising reacting a neutral ligand, (see for example YZL or $YZL^1$ of formula I or II) with a compound represented by the formula $M^{11}X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. The solvent may have a boiling point above 60° C., such as toluene, xylene, benzene, and/or hexane. The solvent may comprise ether and/or methylene chloride.

The second catalyst component may include one or more metallocene compounds (also referred to herein as metallocenes).

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the formula:

$$L^A L^B MQ_n \tag{III}$$

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, $L^A$ and $L^B$, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may be any other ligand structure capable of π-bonding to M. The atomic molecular weight (MW) of $L^A$ or $L^B$ may exceed 60 a.m.u., or may exceed 65 a.m.u. $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one alternative of Formula III only one of either $L^A$ or $L^B$ may be present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula III above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

The catalyst composition may include one or more metallocene catalyst compounds where $L^A$ and $L^B$ of Formula III are bridged to each other by at least one bridging group, A, as represented by Formula IV.

The compounds of Formula IV are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\ R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula IV may have two or more bridging groups A (EP 664 301 B1).

The metallocene catalyst compounds may be those where the R substituents on the ligands $L^A$ and $L^B$ of Formulas III and IV are substituted with the same or different number of substituents on each of the ligands. The ligands $L^A$ and $L^B$ of Formulas III and IV may be different from each other.

The catalyst system may include a first catalyst compound represented by Formula II above, such as a compound having the formula $[(2,3,4,5,6-Me_5C_6)NCH_2CH_2]_2NHZrBz_2$, where $2,3,4,5,6-Me_5C_6$ represents a pentamethylphenyl or a pentamethylcyclohexyl group, and Bz is as described above, and a second catalyst compound that may be represented by Formula III above, such as a bis(cyclopentadienyl) zirconium dichloride compound, such as bis (n-butylcyclopentadienyl) zirconium dichloride.

The ratio of the first catalyst compound to the second catalyst compound may be in the range from about 1:10 to about 10:1, or from about 1:1 to about 8:1 or in the range from about 1:1 to about 6:1.

Activators and Activation Methods for Catalyst Compounds

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization. Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and PCT Publication WO 94/10180.

When the activator is an alumoxane (modified or unmodified), the maximum amount of activator may be selected to be a 5000-fold molar excess Al/M over the catalyst precursor (per metal catalytic site). Alternatively or additionally the minimum amount of activator-to-catalyst-precursor may be set at a 1:1 molar ratio.

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

Supports

The catalyst systems may include a support material or carrier. For example, the at least two catalyst compounds and/or one or more activators may be deposited on, contacted with, vaporized with, bonded to, or incorporated within, adsorbed or absorbed in, or on, one or more supports or carriers. Thus, the above described metallocene catalyst compounds and catalyst systems as well as conventional-type transition metal catalyst compounds and catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material, such as an inorganic oxide, may have a surface area in the range of from about 10 $m^2/g$ to about 700 $m^2/g$, pore volume in the range of from about 0.1 $cm^3/g$ to about 4.0 $cm^3/g$ and average particle size in the range of from about 5 microns to about 500 microns. More preferably, the surface area of the support material may be in the range from about 50 $m^2/g$ to about 500 $m^2/g$, pore volume from about 0.5 $cm^3/g$ to about 3.5 $cm^3/g$ and average particle size of from about 10 microns to about 200 microns. Most preferably the surface area of the support material may be in the range is from about 100 $m^2/g$ to about 400 $m^2/g$, pore volume from about 0.8 $cm^3/g$ to about 3.0 $cm^3/g$ and average particle size is from about 5 microns to about 100 microns. The average pore size of the carrier typically has pore size in the range of from about 10 Angstroms to about 1,000 Angstroms, alternatively from about 50 Angstroms to about 500 Angstroms, and in some embodiments from about 75 Angstroms to about 350 Angstroms.

The catalyst compounds may be supported on the same or separate supports together with an activator, or the activator may be used in an unsupported form, or may be deposited on a support different from the supported catalyst compounds, or any combination thereof. This may be accomplished by any technique commonly used in the art.

There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

Polymerization Process

The polyethylene resins disclosed herein may be prepared by high pressure, solution, slurry or gas phase processes or a combination thereof. The resins may be prepared in a single reactor or in a combination of reactors. Where two or more reactors are utilized these may be arranged in series or parallel.

A staged reactor employing two or more reactors in series, where one reactor may produce, for example, a high molecular weight component and another reactor may produce a low molecular weight component may be used. The polyethylene may be produced using a staged gas phase reactor. Such commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

The polyethylene resins disclosed herein may also be prepared in a single gas phase reactor.

Gas phase processes may utilize a fluidized bed reactor. Optionally, the reactor is a gas phase fluidized bed polymerization reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the polymer product within the reactor. Regardless of the process used to make the polyolefins, e.g., bimodal polyethylene, the polymerization temperature or reaction temperature should be below the melting or "sintering" temperature of the polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyolefin. For example, where trim catalyst is used, the amount of trim catalyst may be adjusted to modify the in-reactor ratio of the at least two different catalyst compounds of the catalyst system so as to achieve a desired flow index or flow index split. The trim catalyst may be fed directly to the reactor separately from the other catalyst compounds of the catalyst system. The trim catalyst may also be mixed with the other catalyst compounds of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported catalyst may comprise an activator or cocatalyst which may activate the trim catalyst 'in-line' prior to feeding to the reactor.

The trim catalyst may be provided in a form that is the same or different to that of one of the at least two different catalyst compounds of the catalyst system. However, upon activation by a suitable activator or cocatalyst the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator or cocatalyst. For example, a metallocene such as bis(n-butylcyclopentadienyl) zirconium $X_2$ may be used in the dichloride form to prepare a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The mole ratio of hydrogen to total monomer ($H_2$:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein. In some embodiments, the mole ratio of hydrogen to total monomer ($H_2$:monomer) may be adjusted to be in a range of from about 0.0001 to about 0.01, on a molar basis. Expressed another way, the amount of hydrogen in the reactor at any time may range up to 5,000 ppm, up to 4,000 ppm, or up to 3,000 ppm, or between 50 ppm and 5,000 ppm, or between 500 ppm and 2,000 ppm.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

The catalyst system may include a silica-supported catalyst system including a Group 15 and metal containing catalyst compound and a metallocene catalyst compound. The catalyst system may also include a trim catalyst comprising a metallocene catalyst compound. An activator or co-catalyst may also be provided on the support, such as MAO.

The catalyst system may comprise two or more catalyst compounds comprising a titanium, a zirconium, or a hafnium atom. The catalyst system may comprise two or more of:

(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Me_5phenyl))_2MX_2$,
(propyl cyclopentadienyl)(tetramethylcyclopentadienyl) $MX_2$,
(butyl cyclopentadienyl)$_2MX_2$,
(propyl cyclopentadienyl)$_2MX_2$, and mixtures thereof,
wherein M is Zr or Hf, and X is selected from F, Cl, Br, I, Me, benzyl, $CH_2SiMe_3$, and $C_1$ to $C_5$ alkyls or alkenyls.

The metallocene catalyst compound may comprise:
(pentamethylcyclopentadienyl)(propylcyclopentadienyl) $MX_2$, (tetramethylcyclopentadienyl)(propylcyclopentadienyl)
  $MX_2$,
(tetramethylcyclopentadienyl)(butylcyclopentadienyl)
  $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
(propyl cyclopentadienyl)(tetramethylcyclopentadienyl)
  $MX_2$,
(butyl cyclopentadienyl)$_2MX_2$,
(propyl cyclopentadienyl)$_2MX_2$, and mixtures thereof,
  wherein M is Zr or Hf, and X is selected from F, Cl, Br,
  I, Me, benzyl, $CH_2SiMe_3$, and $C_1$ to $C_5$ alkyls or
  alkenyls; and the Group 15 and metal containing catalyst compound may comprise:
$HN(CH_2CH_2N(2,4,6-Me_3phenyl))_2MX_2$ or
$HN(CH_2CH_2N(2,3,4,5,6-Me_5phenyl))_2MX_2$,
  wherein M is Zr or Hf, and X is selected from F, Cl, Br,
  I, Me, benzyl, $CH_2SiMe_3$, and $C_1$ to $C_5$ alkyls or
  alkenyls.

The catalyst system may be used to produce a bimodal or multimodal polyethylene resins having a flow index in the range from about 2 to about 60 dg/min and a density of greater than or equal to about 0.945 g/cc, such as in the range from about 0.953 to about 0.96 g/cc. When used to produce such a bimodal or multimodal polyethylene resin in a gas phase reactor, the reactor conditions may include a temperature in the range from about 100° C. to about 120° C., such as from about 105° C. to about 110° C., and a hydrogen to ethylene ratio range from about 0.0010 to about 0.0020, on a molar basis. When the desired swell is high, the hydrogen to ethylene ratio may be controlled to be less than about 0.00140, on a molar basis; when the desired swell is low, the hydrogen to ethylene ratio may be controlled to be greater than about 0.00145 on a molar basis, such as in the range from about 0.00145 to about 0.00155, on a molar basis.

End Uses

The polyethylene compositions may be used in a wide variety of products and end-use applications. The polyethylene compositions may also be blended and/or coextruded with any other polymer. Non-limiting examples of other polymers include linear low density polyethylenes, elastomers, plastomers, high pressure low density polyethylene, high density polyethylenes, polypropylenes and the like.

The polyethylene compositions and blends thereof may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include melt spinning, solution spinning and melt blown fiber operations for use in woven or non-woven form to make filters, diaper fabrics, medical garments, geotextiles, etc. Extruded articles may include medical tubing, wire and cable coatings, pipe, geomembranes, and pond liners. Molded articles may include single and multi-layered constructions in the form of bottles, tanks, large hollow articles, rigid food containers and toys, etc.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

In the following Examples a supported catalyst available as of April 2014 from Univation Technologies LLC, Houston, Tex. as PRODIGY™ BMC-300 Catalyst was utilized along with a solution of a trim catalyst containing one of the catalyst compounds of the supported catalyst. An exemplary trim catalyst is available as of April 2014 from Univation Technologies, LLC, Houston, Tex. as UT-TR-300 Catalyst. The trim catalyst was supplied as a 0.04% by weight solution in Isopar-C.

Polymerization

The catalyst system was used in ethylene polymerizations conducted in a fluidized-bed gas-phase polymerization reactor on a pilot scale. The reactor had 0.57 meters internal diameter and 4.0 meters in bed height. The fluidized bed was made up of polymer granules. The reactor was operated to produce bimodal blow-molding products. The gaseous feed streams of ethylene and hydrogen were introduced below the reactor bed into the recycle gas line. 1-Hexene comonomer was used. The individual flow rates of ethylene and hydrogen were controlled to maintain fixed composition targets. The ethylene concentration was controlled to maintain a constant ethylene partial pressure. The hydrogen flow rate was controlled to maintain a constant hydrogen to ethylene mole ratio. The concentrations of all the gases were measured by an on-line gas chromatograph to ensure relatively constant composition in the recycle gas stream.

The in-reactor ratio of the catalyst compounds of the catalyst system was adjusted with a solution of a trim catalyst so as to control the flow index of the polyethylene. The catalyst components were injected directly into the reactor and the rate of the catalyst feed was adjusted to maintain a constant production rate of polymer of about 45 to 90 kg/hr. The reacting bed of growing polymer particles was maintained in a fluidized state by the continuous flow of the make-up feed and recycle gas through the reaction zone. A superficial gas velocity of 0.6 to 0.8 meters/sec was used to achieve this. The reactor was operated at a total pressure of 2170 kPa. The reactor was operated at a constant reaction temperature of 106° C.

The fluidized bed was maintained at a constant weight of about 300 kg by withdrawing a portion of the bed at a rate equal to the rate of formation of particulate product. The rate of product formation (the polymer production rate) was in the range of 40 to 50 kg/hour. The product was removed semi-continuously via a series of valves into a fixed volume chamber. This product was purged to remove entrained hydrocarbons and treated with a small stream of humidified nitrogen to deactivate any trace quantities of residual catalyst.

In a first experiment the process conditions were set to make a high MFR resin with a FI of about 30. This was achieved by setting the $H_2/C_2$ ratio to about 14.5 ppm/mole % and setting the relative feed rates of PRODIGY™ BMC-300 catalyst and trim catalyst solution. Table 1 summarises the conditions and results. Flow index $I_5$ and $I_{21}$ were measured according to ASTM D1238 at 190° C. and 5 kg or 21.6 kg respectively. Density was measured using ASTM D792.

TABLE 1

High Melt Flow Ratio Product

| Parameter | Setting or result |
|---|---|
| H2/C2 analyzer ratio (ppm/mole %) | 14.5 |
| C6/C2 analyzer ratio | 0.00146 |
| Supported catalyst feed rate (g/hr) of a ca. 23 wt. % slurry | 5.3 |
| Trim catalyst solution feed rate (g/hr) | 47 |
| In-reactor catalyst compound ratio | ca. 2.3 |
| Flow index ($I_{21}$) | 29.5 |
| Melt Flow Ratio ($I_{21}/I_5$) | 38.8 |
| Density (g/cc) | 0.9617 |

The process conditions were adjusted to make a low MFR resin with the target FI of about 30. This was achieved by setting the $H_2/C_2$ ratio to about 11.0 ppm/mole % and the relative catalyst feed rates as shown in Table 2.

TABLE 2

Low Melt Flow Ratio Product

| Parameter | Setting or result |
|---|---|
| H2/C2 analyzer ratio (ppm/mole %) | 10.9 |
| C6/C2 analyzer ratio | 0.00130 |
| Supported catalyst feed rate (g/hr) of a ca. 23 wt. % slurry | 4.7 |
| Trim catalyst solution feed rate (g/hr) | 52 |
| In-reactor catalyst compound ratio | ca. 1.9 |
| Flow index ($I_{21}$) | 31.2 |
| Melt Flow Ratio ($I_{21}/I_5$) | 25.8 |
| Density (g/cc) | 0.9594 |

The results show that simultaneous adjustment of the $H_2/C_2$ ratio and the ratio of the catalyst compounds in the reactor, allow control of MFR while maintaining substantially constant FI.

Figure 2:
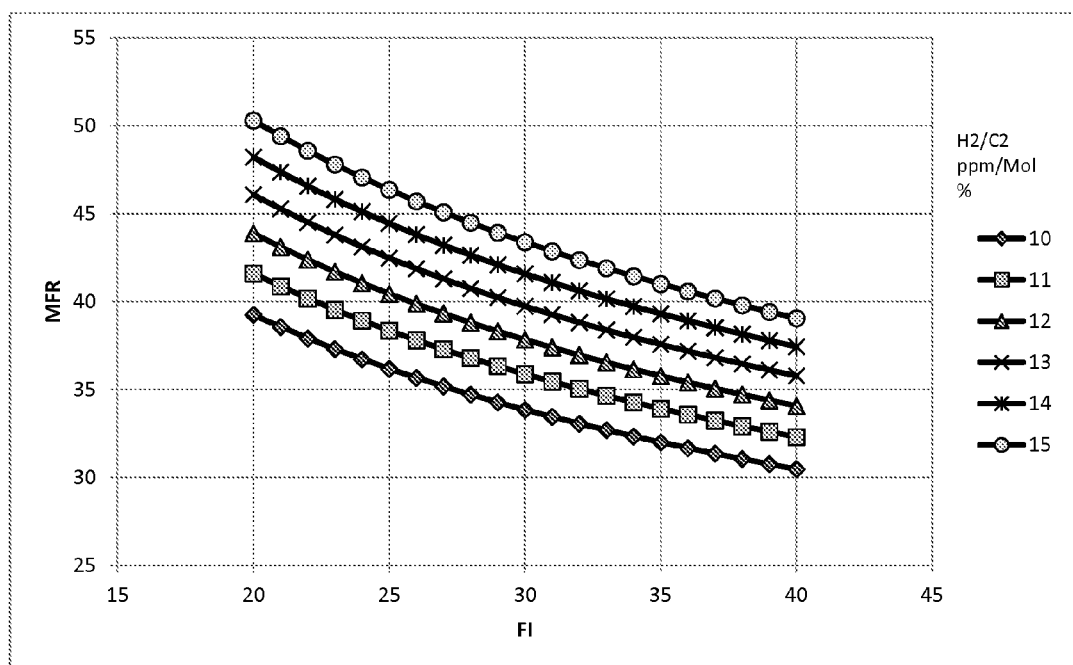
FIG. 2 is a graph illustrating the modeled relationship between melt flow ratio and flow index at different $H_2/C_2$ ratios.

Further pilot plant runs were undertaken varying the $H_2/C_2$ ratio between about 10 ppm/mole % and about 15 ppm/mole % and varying the in-reactor catalyst compound ratio between about 2.5 and about 1.8. FIG. 1 illustrates the actual MFR ($I_{21}/I_5$) data from the pilot plant runs plotted against the results of a regression analysis of the data (indicated as MFR model). It may be seen that there is excellent agreement between the actual and predicted MFR. FIG. 2 illustrates how modelled MFR varies with FI at different hydrogen concentrations. It is apparent that for a given flow index the MFR ratio may be varied through adjustment of the $H_2/C_2$ ratio. Further, as the $H_2/C_2$ ratio is varied the trim catalyst feed rate may also be varied so as to maintain a substantially constant and on target FI. It will be appreciated that the actual ratios used in practice to achieve target FI or MFR could vary depending on, for example, reactor scale, impurity levels in feedstreams, method of control of reactor conditions and product parameter measurements. This would be apparent to the person skilled in the art.

Two polyethylene resins, one of low and one of high MFR, from the pilot plant runs were further tested in connection with swell properties. Two commercial resins were also provided for comparison of physical properties and swell characteristics. The comparative samples included UNIVAL DMDA-6200, a high density Chromium catalyst produced polyethylene resin available from The Dow Chemical Company, Midland, Mich., and HD9856B, a Ziegler-Natta catalyst derived high density polyethylene resin available from ExxonMobil Chemical Company, Houston, Tex. Properties of the comparative resins are also provided in Table 3.

TABLE 3

Properties of Inventive and Comparative Resins

| Property | 1 | 2 | DMDA-6200 | HD9856B |
|---|---|---|---|---|
| Flow Index ($I_{21}$) | 31.2 | 29.5 | 29.3 | 43.2 |
| Melt Flow Ratio ($I_{21}/I_5$) | 25.8 | 38.8 | 19.5 | 20.8 |
| Density (g/cc) | 0.9594 | 0.9617 | 0.9531 | 0.9580 |

Resin Weight Swell

The resin swell characteristics were measured in terms of bottle weight. 1.9 liter industrial round containers with handles were produced on a BEKUM H-121 continuous shuttle extrusion blow molding machine, equipped with a 60 mm standard HDPE screw, a BKZ75 head and diverging tooling. UNIVAL DMDA-6200 was used as the bottle weight standard. At the start of the swell measurement, the machine conditions were adjusted such that a 53+−0.4 g trimmed bottle, with a lower flash (tail) of acceptable dimension (1.5+/−0.25 inches outside the mold) could be produced from the UNIVAL DMDA-6200. The machine conditions adjusted were as follows: extruder temperature profile (360° F.), extruder screw speed (27.5 rpm), cycle time (14 sec) and die gap (13.5%). The extruder temperature profile, cycle time and die gap were held constant at the settings determined with the UNIVAL DMDA-6200 control resin during the swell measurement of the remaining test resins. The resin to be tested was then extrusion blow molded with the rpm adjusted to give a parison weight of 75.3+/−0.4 g, which results in a 53+/−0.4 g trimmed bottle in the case of UNIVAL DMDA-6200 under the conditions above. The weight of the trimmed bottle was reported as the resin weight swell.

Bottle weight swell results are shown in Table 4. The effect of hydrogen to ethylene ratio on the resulting weight swell characteristics of the resin may be seen by comparing the results for Resin 1 with Resin 2 where the higher hydrogen to ethylene ratio resulted in a significant decrease in bottle weight.

TABLE 4

Comparison of Weight Swell

| Resin | Type | Wt. Swell (g) |
|---|---|---|
| 1 | Low H2/C2 | 53.7 |
| 2 | High H2/C2 | 45.0 |
| Comparative | DMDA-6200 | 52.9 |
| Comparative | HD 9856B | 43.8 |

It may also be seen that the low $H_2/C_2$ sample (Resin 1) has the high swell characteristics of DMDA-6200, which is a high swell unimodal chromium catalyst resin, whereas the high $H_2/C_2$ sample (Resin 2) has the low swell characteristics of HD 9856B, which is a low swell bimodal Ziegler-Natta catalyst resin.

It will be appreciated that the embodiments disclosed herein provide a method of producing polyethylene resins with target MFR and resin swell simply by manipulating polymerization process conditions utilizing a single catalyst system in a single production unit.

As described above, embodiments disclosed herein provide a method for tailoring the MFR and the weight and diameter swell characteristics of a polyethylene composition. Specifically, the tailoring may be performed during the polymerization process. The ability to tailor the weight swell of the resin may advantageously provide for a resin producer to meet the needs of their customers, suiting the particular extrusion blow molding machines being used, for example.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

What is claimed is:

1. A method of modifying the melt flow ratio ($I_{21}/I_5$) measured according to ASTM-D-1238 ($I_{21}$ and $I_5$ measured at 190° C. and 21.6 kg or 5 kg weight respectively) of a polyethylene resin, the method comprising:
   a) feeding a catalyst system comprising two different catalyst compounds, hydrogen, ethylene, and optionally a comonomer to a polymerization reactor; wherein the two different catalyst compounds produce different average molecular weight polyethylene at the same ratio of hydrogen to ethylene; and
   b) adjusting both the ratio of hydrogen to ethylene in the reactor between 10 ppm/mole % and 15 ppm/mole % and
      a molar ratio of the in-reactor catalyst compound ratio from 2.5 to 1.8 to maintain a flow index, $I_{21}$, value substantially constant while modifying the melt flow ratio ($I_{21}/I_5$).

2. The method of claim 1 wherein the melt flow ratio increases as the ratio of hydrogen to ethylene increases.

3. The method of claim 1 comprising co-feeding to the polymerization reactor a supported catalyst comprising at least two different catalyst compounds and a trim catalyst comprising at least one of the catalyst compounds of the supported catalyst.

4. The method of claim 3 wherein the ratio of the catalyst compounds of the catalyst system is adjusted by increasing or decreasing the feed rate of the trim catalyst relative to the feed rate of the supported catalyst.

5. The method of claim 3 wherein the trim catalyst is a non-supported catalyst compound.

6. The method of claim 3 wherein the trim catalyst is mixed with the supported catalyst prior to feeding to the reactor.

7. The method of claim 1 further comprising adjusting the temperature of the polymerization reactor.

8. The method of claim 1 wherein the catalyst system comprises at least one metallocene catalyst compound and/or at least one Group 15 and metal containing catalyst compound.

9. The method of claim 1 wherein the catalyst system comprises bis(cyclopentadienyl) zirconium $X_2$, wherein the cyclopentadienyl group may be substituted or unsubstituted, and at least one of a bis(arylamido) zirconium $X_2$ and a bis(cycloalkylamido) zirconium $X_2$, wherein X represents a leaving group.

10. The method of claim 1 wherein the polyethylene is a bimodal or a multimodal polyethylene.

11. The method of claim 1, wherein the polyethylene resin has a melt flow ratio ($I_{21}/I_5$) in the range from about 10 to about 60, measured according to ASTM-D-1238 ($I_{21}$ and $I_5$ measured at 190° C. and 21.6 kg or 5 kg weight respectively), a flow index, $I_{21}$, in the range from about 2 to about 60 dg/min, and a density of greater than or equal to about 0.945 g/cc, measured according to ASTM D 792.

12. The method of claim 1, wherein the polymerization reactor is a single reactor or multiple reactors arranged either in series or in parallel.

13. The method of claim 12, wherein the single polymerization reactor is a gas phase reactor.

14. The method of claim 1, wherein the hydrogen to ethylene ratio is adjusted to within a range from about 0.0001 to about 0.01, on a molar basis.

15. The method of claim 1, wherein said comonomer comprises at least one of 1-butene, 1-hexene, and 1-octene.

16. A method of modifying the melt flow ratio ($I_{21}/I_5$) measured according to ASTM-D-1238 ($I_{21}$ and $I_5$ measured at 190° C. and 21.6 kg or 5 kg weight respectively) of a polyethylene resin, the method comprising:
   a) feeding a catalyst system comprising two different catalyst compounds, hydrogen, ethylene, and optionally a comonomer to a polymerization reactor;
      wherein the two different catalyst compounds produce different average molecular weight polyethylene at the same ratio of hydrogen to ethylene; and
   b) adjusting both the ratio of hydrogen to ethylene in the reactor between 10 ppm/mole % and 15 ppm/mole % and
      a molar ratio of the in-reactor catalyst compound ratio from 2.5 to 1.8 to maintain a flow index, $I_{21}$, value substantially constant while modifying the melt flow ratio ($I_{21}/I_5$),
      wherein the polyethylene resin has a melt flow ratio ($I_{21}/I_5$) in the range from about 10 to about 60, a flow index, $I_{21}$, in the range from about 2 to about 60 dg/min, and a density of greater than or equal to about 0.945 g/cc, measured according to ASTM D 792.

* * * * *